July 2, 1957  B. EDWARDS  2,797,703
PLASTIC GREASE FITTING
Filed Jan. 28, 1955

INVENTOR.
Bryant Edwards
BY
Olson & Trexler
attys

United States Patent Office 2,797,703
Patented July 2, 1957

2,797,703
PLASTIC GREASE FITTING

Bryant Edwards, Chicago, Ill., assignor to Illinois Tool Works, Chicago, Ill., a corporation of Illinois Application January 28, 1955, Serial No. 484,758

7 Claims. (Cl. 137—539)

The present invention relates to a novel fitting or valve for controlling the flow of fluid material and more particularly, to a novel fitting or valve through which a lubricant such as grease and the like can be forced into a system and which automatically functions to prevent the lubricant from leaking from the system.

Various metal grease fittings have heretofore been suggested which generally function in a satisfactory manner but which include relatively complicated spring and valve mechanisms so that they are expensive to manufacture. Furthermore, such heretofore suggested fittings which include a metal body adapted to be threaded into a casting or other part are not always satisfactory since, for example, if the lubricant or grease in the system is under a high pressure, a portion of the lubricant may leak past the threads of the fitting and if the apparatus is subjected to substantial vibrations, the threaded body may work loose.

It is a primary object of the present invention to provide a novel grease fitting or valve structure having simplified valve means so that the device may be more economically manufactured.

A more specific object of the present invention is to provide a novel fitting of the type mentioned above which may be easily and economically manufactured from a plastic material.

Another more specific object of the present invention is to provide a novel grease fitting or the like having a plastic body and a valve member, which body has integral resilient elements for operatively retaining the valve member.

Further objects of the present invention are to provide a novel plastic grease fitting adapted to be threaded into a workpiece, which fitting will not work loose and will prevent leakage of the fluid material or lubricant even when the lubricant is placed under high pressure.

Other objects and advantages of the present invention will become apparent from the following description and the accompanying drawings wherein.

Figure 1:
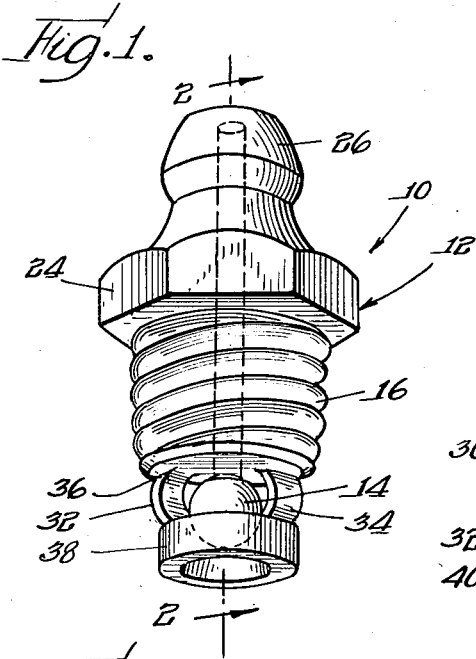
Fig. 1 is a perspective view showing a fitting embodying the principles of this invention.
Figure 2:
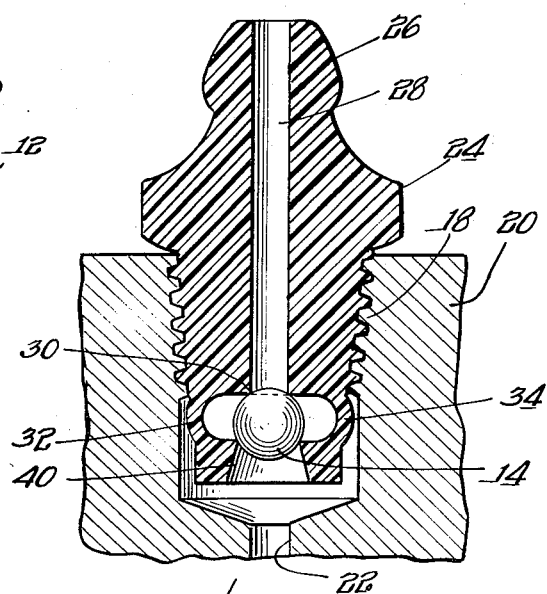
Fig. 2 is a sectional view of the fitting taken along line 2—2 in Fig. 1 and further showing a fitting mounted in an apertured workpiece.

Referring now more specifically to the drawings wherein like parts are designated by the same numerals throughout the various figures, a fitting 10 embodying one form of the present invention is shown in Figs. 1 through 3 and 5. The fitting 10 includes a body member 12 which is made from a suitable plastic material such, for example, as nylon and a ball type valve member 14 which also may be made from plastic material but is preferably made from metal.

The plastic body member includes a threaded portion 16 which is adapted to be threaded into an aperture 18 of a workpiece 20. As will be understood, the workpiece 20 forms a part of a fluid or lubricating system and a passageway 22 communicates with the bottom end of the aperture 18 for directing the fluid material or lubricant forced through the fitting to other portions of the system. It should be noted that since the body member 12 is made from a resilient plastic material such as nylon, the threads thereof will closely conform to and tightly grip the threads of the workpiece so as to prevent the fitting from working loose and also to prevent any of the fluid material or lubricant from leaking past the threads. The body member 12 is also provided with a nut portion 24 to facilitate application thereof to the workpiece and a suitably formed nipple portion 26 to which the tip of a grease gun or the like may be applied in a known manner.

Figures 5, 7:
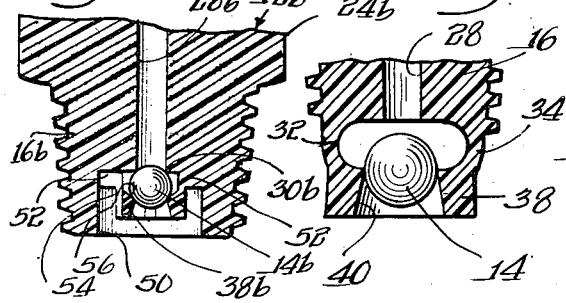
Fig. 5 is a fragmentary sectional view showing how the ball valve of the fitting shown in Figs. 1 through 3 is assembled with the plastic portion of the fitting.
Fig. 7 is a fragmentary sectional view taken along line 7—7 in Fig. 6.

A passageway 28 extends axially through the plastic body member and the inner or outlet end of the passageway is defined by a valve seat 30. The ball type valve member 14 is normally held against the valve seat 30 to prevent the fluid material or lubricant in the system from leaking back through the passageway 28. In accordance with the present invention, extremely simple means is provided for retaining the valve member 14 in cooperative relationship with the valve seat. This means includes a pair of resilient plastic flexure spring elements or arms 32 and 34 which extend generally axially from the inner end 36 of the threaded portion of the body member 12. The elements 32 and 34 are connected with an annular plate like member 38 having a central aperture 40 in which the valve member seats. As shown in the drawings, the flexure spring elements or arms 32 and 34 are normally curved so that the valve member is yieldably held against the valve seat 30. Preferably, the flexure spring elements or arms are formed integrally with the body member 12 and the plate like member 38 whereby the fitting may be manufactured more economically. The valve member is assembled by forcing it through the aperture 40 as shown in Fig. 5, which aperture may expand because of the resilient nature of the plastic material sufficiently to permit the valve to pass therethrough. As shown in the drawings, the aperture 40 is flared so as to facilitate assembly of the valve member. It is understood, of course, that after the valve member has been inserted through the aperture, the resilient material of the plate like member 38 will contract so that the valve member is trapped in assembled relationship.

Figure 3:
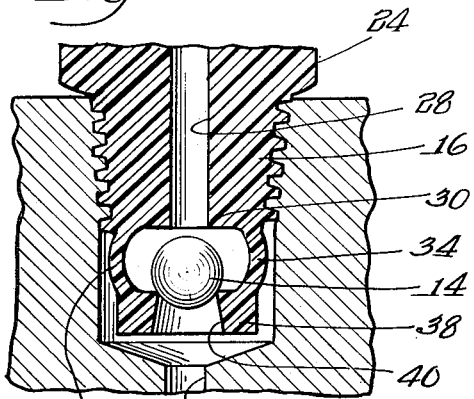
Fig. 3 is a fragmentary sectional view similar to Fig. 2 and further showing how the valve of the fitting is operated to permit fluid material or lubricant to flow through the fitting and into the system.

The operation of the above described structure is as follows. A grease gun or the like is applied to the nipple 26 in the usual manner and the fluid material or grease is forced into the passageway 28 under pressure. The grease under pressure unseats the valve member as shown in Fig. 3 and this movement of the valve member is permitted by flexing or straightening of the arms 32 and 34. After the valve member is unseated, the grease flows between the arms and around the valve member into the lower portion of the aperture 18 and out through the passageway 22. When the grease gun or the like is removed, the spring arms 32 and 34 flex back to the positions shown in Fig. 2 so as to urge the valve member against the valve seat to prevent the lubricant in the system from leaking out through the passageway 28.

Figure 4:
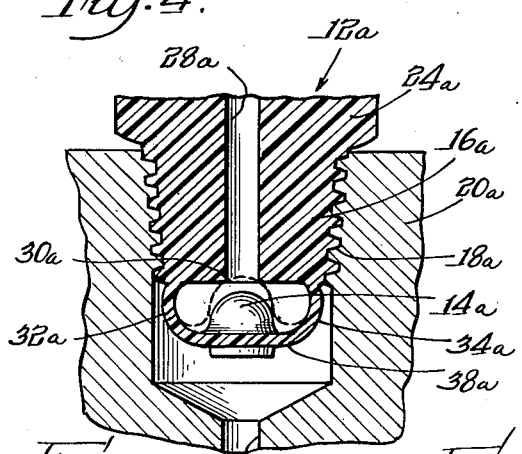
Fig. 4 is a fragmentary sectional view showing a modified form of the present invention.

In Fig. 4 there is shown a modified form of the present invention which is similar to the above described embodiment as indicated by the application of identical reference numerals with the suffix *a* added to corresponding elements. In this embodiment the valve member 14a is formed from plastic and is mounted on or made integral with the flexure arms 32a and 34a and the connecting portion 38a. The arms 32a and 34a are formed so that they hold the valve member 14a in alignment with the valve seat 30a. When the fitting of this embodiment is to be used in a lubricating system or the like wherein a substantial back pressure is developed, the arms 32a and 34a may conveniently be formed so that the valve member normally tends to assume the position shown in solid lines or in other words, tends to assume an open position. This arrangement facilitates manufacturing of the fitting. It is understood, of course, that the fluid material or lubricant under pressure in the system will normally act upon the valve member and force it to the broken line position against the seat 30a whereby the lubricant is prevented from escaping through the passageway 28a.

Figure 6:
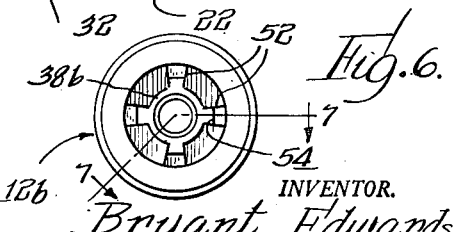
Fig. 6 is an end view showing another modified form of the present invention.

In Figs. 6 and 7 there is shown another embodiment of the present invention which is similar to the above described structures as indicated by the application of identical reference numerals with the suffix *b* added to corresponding elements. This embodiment differs in that instead of providing the valve seat at the lower end of the threaded shank portion, a counterbore 50 is provided in the inner end of the threaded shank portion and the valve seat 30b is located well within the threaded shank portion. The ball valve member 14b is retained by an annular plate like member 38b having a relatively thin and flexible wall, which annular member is integral with a plurality of spaced webs 52. Each web is recessed or cut away as indicated at 54 to provide a relatively narrow flexible finger extending down along the side of the annular member 38b. As shown in Fig. 7, the annular member is provided with a conical seat 56 for retaining the ball. With this structure the ball is resiliently retained against the seat 30b, but when grease under pressure is forced through the passageway 28b, the ball is forced downwardly against the conical seat 56 and wedges or forces the annular member 38b and the finger portions of the web outwardly sufficiently to permit the ball to drop away from the valve seat 30b whereby the grease flows around the ball and between the webs 52 and into the system. After the grease has been introduced into the system, the annular member 38b and the finger or flexure spring portions of the webs spring back to their original positions and again force the ball against the seat 30b. This embodiment has the advantages of being substantially shorter than the embodiments described above and of requiring less plastic material since the ball valve member is supported well within the threaded shank portion.

From the above description it is seen that the present invention has provided a novel plastic fitting which fully satisfies the objects heretofore set forth. More specifically, it will be appreciated that the fitting of this invention is of extremely simple construction and may be economically manufactured. More specifically, it is seen that the valve mechanism of the fitting is of extremely simple construction, yet is highly efficient. Furthermore, it is seen that the use of resilient plastic material for the body of the fitting prevents the fitting from working loose and prevents leakage past the threads of the fitting.

Other advantages of the plastic fitting of this invention are that the plastic fitting will not corrode as will certain metal fittings of the general type contemplated herein and the plastic fitting may be easily removed from the work in the event that it becomes damaged.

While the preferred embodiment of the present invention have been shown and described herein, it is obvious that many structural details may be changed without departing from the spirit and scope of the appended claims.

The invention is claimed as follows:

1. A valve assembly comprising a one-piece plastic body member having a fluid passageway therethrough with a valve seat at its inner end, a valve member cooperable with said valve seat to control the passage of fluid through said passageway, a plurality of spaced resilient sections integral with said body member and projecting therefrom in a direction axially away from said valve seat, said spaced resilient sections presenting a plurality of passages from the vicinity of said valve seat radially outwardly beyond said valve member, said passages in combination being at least as great in cross sectional area as the aforementioned fluid passageway to facilitate flow of fluid from the vicinity of the valve seat and said valve member, plastic shoulder means integral with the ends of said resilient sections and normally spaced thereby from said valve seat a distance less than the axial extent of said valve member for normally urging said valve member to seated position closing said passageway, and said shoulder means presenting an internal aperture of less width than the maximium width of said valve member and being expansible to permit assembly of the valve member therethrough to its operative position trapped between the contracted shoulder means and the valve seat.

2. A valve assembly as claimed in claim 1, wherein the body member is externally threaded for engagement with a threaded aperture of a workpiece structure, and wherein the body member is provided with a head portion through which the fluid passageway extends.

3. A valve assembly as claimed in claim 2, wherein the threaded portion of the body member is tapered to provide a sealing fit with the threaded aperture of the workpiece.

4. A valve assembly as claimed in claim 2, wherein the head is provided with polygonal wrenching means facilitating application of the assembly to the workpiece.

5. A valve assembly comprising a one-piece plastic body member having a fluid passageway therethrough with a valve seat at its inner end, a valve member cooperable with said valve seat to control the passage of fluid through said passageway, a plurality of spaced resilient sections integral with said body member and projecting therefrom in a direction axially away from said valve seat, said spaced resilient sections presenting a plurality of passages from the vicinity of said valve seat radially outwardly beyond said valve member, said passages in combination being at least as great in cross sectional area as the aforementioned fluid passageway to facilitate flow of fluid from the vicinity of the valve seat and said valve member, an annular plastic ring member integral with the ends of said resilient sections and normally spaced thereby from said valve seat a distance less than the axial extent of said valve member, and presenting an annular shoulder for normally urging said valve member to seated position closing said passageway, and said annular ring member presenting an internal aperture of less width than the maximum width of said valve member and being expansible to permit assembly of the valve member therethrough to its operative position trapped between the annular ring member and the valve seat.

6. A valve assembly comprising a one-piece plastic body member having a counterbore within the inner end thereof and a fluid passageway therethrough with a valve seat at its inner end and within the said counterbore, a valve member cooperable with said valve seat to control the passage of fluid through said passageway, a plurality of spaced resilient sections integral with said body member and projecting therefrom in a direction axially away from said valve seat, said spaced resilient sections presenting a plurality of passages from the vicinity of said valve seat radially outwardly beyond said valve member, said passages in combination being at least as great in cross sectional area as the aforementioned fluid passageway to facilitate flow of fluid from the vicinity of the valve seat and said valve member, plastic shoulder means integral with the ends of said resilient sections and normally spaced thereby from said valve seat a distance less than the axial extent of said valve member for normally urging said valve member to seated position closing said passageway, and said shoulder means presenting an internal aperture of less width than the maximum width of said valve member and being expansible to permit assembly of the valve member therethrough to its operative position trapped between the contracted shoulder means and the valve seat.

7. A valve assembly as claimed in claim 6, wherein the shoulder means comprises an annular ring member integral with the ends of said spaced resilient sections, and wherein the said resilient sections and annular ring member are disposed within the counterbore at the inner end of the body member.

References Cited in the file of this patent

UNITED STATES PATENTS

| | | |
|---|---|---|
| 1,997,955 | Weaver | Apr. 16, 1935 |
| 2,147,153 | Crowley | Feb. 14, 1939 |
| 2,219,190 | McCoy | Oct. 22, 1940 |
| 2,355,862 | Harper | Apr. 15, 1944 |

FOREIGN PATENTS

| | | |
|---|---|---|
| 803,653 | France | July 15, 1936 |